US010532450B2

(12) United States Patent
Johansson et al.

(10) Patent No.: US 10,532,450 B2
(45) Date of Patent: Jan. 14, 2020

(54) TOOL KIT FOR VEHICLES

(71) Applicant: Wallmek i Kungälv AB, Kungälv (SE)

(72) Inventors: Sten Johansson, Lycke (SE); Niklas Wallman, Kungälv (SE); Martin Hasselskog, Kärna (SE)

(73) Assignee: WALLMEK I KUNGÄLV AB, Kungälv (SE)

( * ) Notice: Subject to any disclaimer, the term of this patent is extended or adjusted under 35 U.S.C. 154(b) by 164 days.

(21) Appl. No.: 15/806,944

(22) Filed: Nov. 8, 2017

(65) Prior Publication Data

US 2018/0141194 A1 May 24, 2018

(30) Foreign Application Priority Data

Nov. 22, 2016 (EP) .................................... 16200076

(51) Int. Cl.

*B23P 19/04* (2006.01)
*B25B 27/00* (2006.01)
*B25B 27/06* (2006.01)
*B25B 27/02* (2006.01)

(52) U.S. Cl.

CPC ........ *B25B 27/0035* (2013.01); *B25B 27/026* (2013.01); *B25B 27/064* (2013.01)

(58) Field of Classification Search

CPC ......... B23P 11/00; B23P 11/005; B23P 19/00; B23P 19/04; B25B 5/00
See application file for complete search history.

(56) References Cited

U.S. PATENT DOCUMENTS 3,964,149 A * 6/1976 Hugh .................... B25B 27/023 29/261
4,908,925 A 3/1990 Johnson
5,159,743 A * 11/1992 Somerville ........... B25B 27/026 29/252

(Continued)

FOREIGN PATENT DOCUMENTS

DE 851 777 C 10/1952
DE 963 320 C 5/1957

(Continued)

OTHER PUBLICATIONS

Search Report dated Jul. 19, 2017, by the European Patent Office for Application No. 16200076.4.

(Continued)

*Primary Examiner* — Lee D Wilson
(74) *Attorney, Agent, or Firm* — Buchanan Ingersoll & Rooney P.C.

(57) ABSTRACT

A tool kit for vehicles, for dismounting, mounting and/or separating components associated with transmission assemblies and/or suspension assemblies. The tool kit includes a tool yoke including an elongated body, a threaded central through hole and a slit arranged on each side of the central through hole. Each slit is arranged to receive at least one threaded jaw fastener to extend there through. Further, the tool kit includes a pair of jaw units attachable to the tool yoke and arranged to engage one of the components in order to perform an operation thereon. The jaw units are securable to the tool yoke at different positions along the tool yoke by the jaw fasteners.

6 Claims, 14 Drawing Sheets

(56) References Cited

U.S. PATENT DOCUMENTS

| | | | | | |
|---|---|---|---|---|---|
| 5,419,027 | A * | 5/1995 | McPeak | B25B 27/023 29/252 |
| 5,557,833 | A * | 9/1996 | Pool | B25B 27/023 29/261 |
| 5,887,328 | A * | 3/1999 | Rydin | B25B 27/02 29/259 |
| 7,520,041 | B1 * | 4/2009 | Aguilar | B25B 27/023 29/255 |
| 7,770,277 | B2 * | 8/2010 | Wridt | B25B 27/023 29/255 |
| 8,015,683 | B2 * | 9/2011 | Hume | B25B 27/023 29/244 |
| 8,464,411 | B2 * | 6/2013 | Betcher | B66F 3/36 29/259 |
| 9,073,190 | B2 * | 7/2015 | Sjosten | B25B 27/0064 |
| 2006/0053609 | A1 * | 3/2006 | Wridt | B25B 27/023 29/261 |
| 2017/0014981 | A1 | 1/2017 | Wallman et al. | |
| 2018/0141194 | A1 * | 5/2018 | Johansson | B25B 27/0035 |

FOREIGN PATENT DOCUMENTS

| | | | |
|---|---|---|---|
| DE | 102 31 826 | A1 | 2/2004 |
| DE | 10 2012 006700 | A1 | 10/2012 |
| EM | 002807436-0001 | | 10/2015 |
| EM | 002807436-0003 | | 10/2015 |
| EM | 002807438-0002 | | 10/2015 |
| EM | 003068006-0001 | | 4/2016 |
| EM | 003068006-0002 | | 4/2016 |
| EM | 003477090-0001 | | 11/2016 |
| EM | 003477090-0002 | | 11/2016 |
| EP | 1 762 341 | A2 | 3/2007 |
| EP | 1 785 233 | A2 | 5/2007 |
| EP | 1 790 437 | A2 | 5/2007 |
| EP | 2 163 347 | A2 | 3/2010 |
| EP | 2 163 348 | A1 | 3/2010 |
| EP | 3 117 961 | A1 | 1/2017 |
| EP | 3 156 179 | A1 | 4/2017 |
| EP | 3 168 007 | A1 | 5/2017 |
| FR | 664 000 | A | 8/1929 |
| TW | M 351 280 | U | 2/2009 |
| WO | WO 2010/12144 | A1 | 10/2010 |

OTHER PUBLICATIONS

Search Report dated Aug. 25, 2017, by the European Patent Office for Application No. 16200070.7.

U.S. Appl. No. 29/604,325, filed May 17, 2017, Sten Johansson, Niklas Wallman and Martin Hasselskog.

U.S. Appl. No. 29/604,325, Johnsson et al.

Wallmek 01-00037 Hub dismounting tool [online]; Wallmek I Kungalv AB; retrieved from the Internet: url: https://www.wallmek.se/en/produkt/passenger-cars/wheel-bearing-axle-shaft-hub-brakes/01-00037/ [retrieved on May 16, 2017], 3 pages.

* cited by examiner

TOOL KIT FOR VEHICLES

CROSS REFERENCE TO RELATED APPLICATIONS

The present application claims the benefit of European Application No. 16200076.4, filed on Nov. 22, 2016. The entire contents of European Application No. 16200076.4 are hereby incorporated herein by reference in their entirety.

TECHNICAL FIELD OF THE INVENTION

The present invention relates to tools for vehicles (such as cars, buses, trucks, etc.), more specifically the present invention relates to a tool kit for use in vehicle repairs or vehicle dismantling.

BACKGROUND

There is an ever present need to reduce costs and to facilitate the life of workshop (vehicle repair shop) operators, i.e. mechanics. The immense amount of manufacturers in the automotive industry often leads to an even larger number of tools and equipment within the workshops. Many times this problem originates due to the fact that a specific vehicle component will have different dimensions, number of bolts or other structural details depending on which manufacturer it originates from.

Consequently, workshops are oftentimes forced to have a large amount of tools which essentially serve the same purpose which can be both costly and inconvenient. Examples of vehicle components that differ in dimensions and other structural details, as mentioned in the foregoing are, e.g. wheel bearings, wheel hubs, drive shaft hubs, support bearings, etc.

However, it has proven to be difficult to make tools that are to some extent universal, i.e. compatible with a component or vehicle part from several different manufacturers. This is not only due to the fact that the tools need to be versatile and/or adjustable in order to fit a number of different dimensions, but it also needs to be robust and durable as many of the above-mentioned components tend to get stuck, due to contamination or corrosion, which makes them extremely hard to remove. Further, many of the currently available tools or tool kits include many individual parts which should be assembled upon every use, which is a work intensive step for the mechanics and consequently not very cost effective for the repair shop nor the consumers buying the service. Examples of such work intensive tools can be found in e.g. EP 1 790 437 or DE102012006700

There is therefore a need for a new and improved tool or tool kit for various vehicle repair applications which is universal, cost effective and at the same time easy to use.

SUMMARY OF THE INVENTION

It is therefore an object of the present invention to provide a jaw unit and a dismounting tool for separating a wheel hub from a wheel bearing, which alleviates all or at least some of the above-discussed drawbacks of presently known systems.

This object is achieved by means of a tool kit as defined in the appended claims.

According to a first aspect of the present invention, there is provided a tool kit for vehicles for mounting, dismounting or separating components associated with transmission assemblies or suspension assemblies, such as bearings, hubs, brakes, etc. The tool kit comprises:

a tool yoke including:

an elongated body extending along a first axis, a central through hole having a hole axis (central axis) perpendicular to said first axis, wherein said central through hole is threaded, and two slits, one slit arranged on each side of said central through hole, each slit being enclosed within the elongated body and having a main extension along said first axis, wherein each of said slits is arranged to receive at least one threaded jaw fastener extending therethrough; and wherein the tool kit further comprises a pair of jaw units attachable to said tool yoke by means of said threaded jaw fasteners extending through the slits, said jaw units being securable to the tool yoke at different positions along the first axis.

Hereby, a robust, cost effective and user friendly means for various mounting, dismounting and separating operations when working on drive shafts or wheel shafts of motor vehicles, is presented. Furthermore, the tool kit can easily be adapted to account for varying dimensions between vehicle manufacturers, making the inventive tool kit very versatile. Transmission assemblies and suspension assemblies is to be understood as for example, drive shafts, wheel shafts, and various components associated therewith, mainly hubs, flanges, bearings, brakes, etc. These parts of a vehicle are often associated with particular tool requirements in terms of robustness, versatility and size. This is because the required forces to dismount or mount components thereto are relatively large, the dimensions and shapes of the components can differ greatly between vehicle models, and the accessibility is often limited which means that the tools should be dimensioned accordingly and easy to use.

A tool yoke is in the present context to be interpreted as a part that secures two or more components so that they move together. The tool yoke will however be further exemplified and described in the detailed description.

Further, the slits are to be interpreted as elongated openings, of a generally rectangular shape (which may or may not have rounded corners) where the long sides or the extension axis are/is parallel to the first axis (i.e. the extension axis of the tool yoke). The hole openings of the slits being arranged on the same two sides of the tool yoke as those of the central through hole, so that the hole axis of each slit and the hole axis (center axis) of the central through hole are parallel.

The present invention is based on the realization that currently available tool kits used for wheel shaft or drive shaft maintenance or repair are often difficult to operate and/or not particularly versatile which increases costs for conventional workshops. Thus, the present inventors realized that, by providing a tool kit having a tool yoke which is compatible with a large variety of different jaw units and is furthermore robust and simple to handle, many of the problems associated with currently known products can be overcome.

In more detail, by arranging a threaded central through hole and two slits on each side of the central through hole, the slits being enclosed within the elongated body, the tool kit can be used both for a pulling or pressing operations. By enclosing the slits within the tool yoke body, instead of having them open at one end, the tool kit is made more user friendly and most of all safe-to-use since the risk of having the jaw units sliding outwards and ultimately de-attaching from the tool yoke is diminished. Slits enclosed within the took yoke body is in the present context to be understood as, that the slits are circumferentially defined by the tool yoke body.

Even further, in accordance with an embodiment of the present invention, the tool yoke further includes:

a pair of threaded securing holes arranged on a flank surface of each side of the tool yoke, said threaded securing holes having a central axis (hole axis) parallel to said first axis; and wherein each of said threaded securing holes is arranged to receive a correspondingly threaded securing fastener having a bottom surface configured to abut against said jaw fastener within said slit, in order to block said jaw units from moving away from each other during operation of the tool kit. This allows for further securing the position of the jaw units during operation of the tool kit, and reduces the risk of the jaw units sliding outwards away from each other when subjected to the large forces often associated with such operations, thereby reducing the risk of damaging components or injuring operators. Furthermore, by having the securing holes arranged on a flank surface such that the securing fasteners can abut against the jaw fastener within the slit, instead of abutting against e.g. the heads of the jaw fasteners, the risk of injury, e.g. fingers being clamped, is further reduced.

Moreover, by having the contact interface between the jaw fastener and the securing fastener within the slit, the contact point between the two is closer to the engaging interface between the jaw fastener and the jaw unit, this reduces the risk of the jaw fastener breaking off when the jaw units are subjected to outwardly directed forces. In other words, the length of the formed lever is reduced. Thus, making the tool kit more robust.

In accordance with yet another embodiment of the present invention, the tool yoke further includes a recessed groove arranged on a bottom surface which is facing said jaw units when said jaw units are attached to the tool yoke, and wherein each of said jaw units comprises at least one protruding guide portion insertable into the recessed groove, for allowing a non-rotational, sliding movement of the jaw units along the tool yoke.

As mentioned, the jaw units can be secured to the tool yoke at various distances from each other, i.e. the jaw units are adjustable or movable along the supporting members. This is in order to be able to use the tool kit on a plurality of different vehicles or vehicle models, since the tool kit can be adapted to a number of differently sized components, such as e.g. wheel bearings, wheel hubs, etc. Thus, by providing a recessed groove on the tool yoke and a corresponding protruding guide portion the jaw units cannot twist or turn when brought into engagement with a vehicle component and the jaw units are in good alignment in reference to each other, ensuring even pressure distribution and safe practice during operating of the tool kit.

Further, in accordance with yet another embodiment of the present invention, the tool kit further comprises:

a pair of threaded jaw fasteners arrangeable to extend through each slit so to engage correspondingly threaded openings in each jaw unit;

a single washer for each pair of threaded jaw fasteners for supporting a pair of jaw fastener heads during a pulling operation.

When using the tool kit in a pulling operation, e.g. engaging a correspondingly threaded hydraulic cylinder in the central through hole, it is advantageous to secure the jaw units with two threaded jaw fasteners each in order to further increase robustness and make the tool compatible with repair or maintenance operations requiring the use of larger forces. Furthermore, by using a single washer having two openings (i.e. one washer for each pair of threaded jaw fasteners) the jaw units can be made more compact, and the overall tool kit is easier to assemble.

Yet further, in accordance with yet another embodiment of the present invention, the tool kit further comprises a sleeve having an outer threading and being configured to engage and be mounted in the threaded central through hole. Hereby the threading of the central through hole can be protected and the use of the inventive tool kit during e.g. a pulling or pressing operation is facilitated. In more detail, if the tool kit is for example used together with a hydraulic cylinder a threaded pulling rod is often arranged to extend through the central through hole and further through e.g. a wheel hub, wheel bearing or the like. The tool kit may then be used to act as a counter hold, where the jaw units are arranged to press against a surrounding surface of the component intended to be pulled, while the pulling rod of the hydraulic cylinder effectively pulls the component towards the tool yoke by moving through the central through hole. It is therefore desirable that the pulling rod does not engage any of the threads of the central through hole in order to facilitate the operation.

Moreover, in accordance with yet another embodiment of the present invention, the pair of jaw units are formed as L- or T-shaped structures having a stem section and a foot section, each stem section comprising at least one threaded hole formed on a top surface of the stem section and extending along a main extension axis of the stem section; and wherein the extension axis of the stem sections is parallel to the central axis of the through hole when the jaw units are attached to the tool yoke. These specific formations of the jaw units diminish the need of additional attachments or parts during normal operation of the tool kit, as compared to prior known systems. Each jaw unit is preferably made in one single piece in order to facilitate handling by reducing the need for tedious assembling of the tool kit prior to using it.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. The tool kits to be discussed and presented in the following along with its components are preferably made from a rigid material such as any metal or alloys, it can however be made from other materials depending on the desired application as will be obvious for one skilled in the art. The method for manufacturing such a tool using a metallic material is considered to be well known in the art and for the sake of brevity omitted in the following.

Figure 1A:
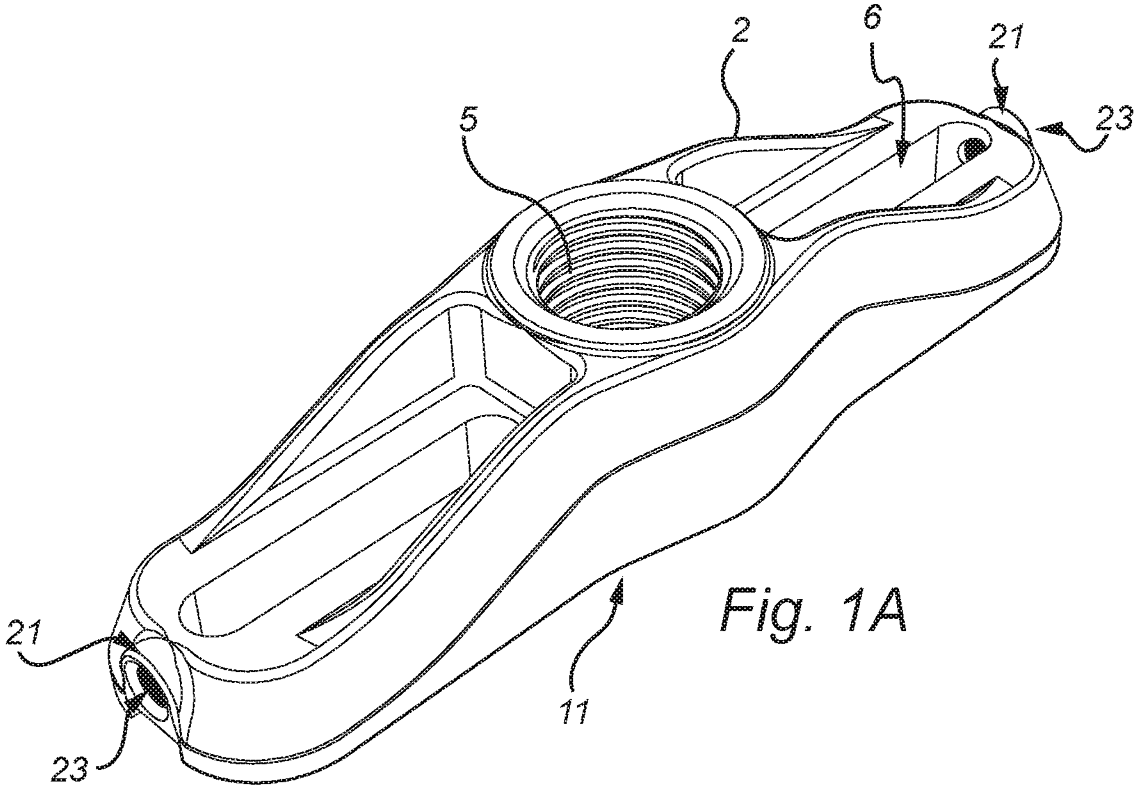
FIGS. 1A and 1B illustrate two different perspective views of a tool yoke of a tool kit in accordance with an embodiment of the invention.
Figure 1B:
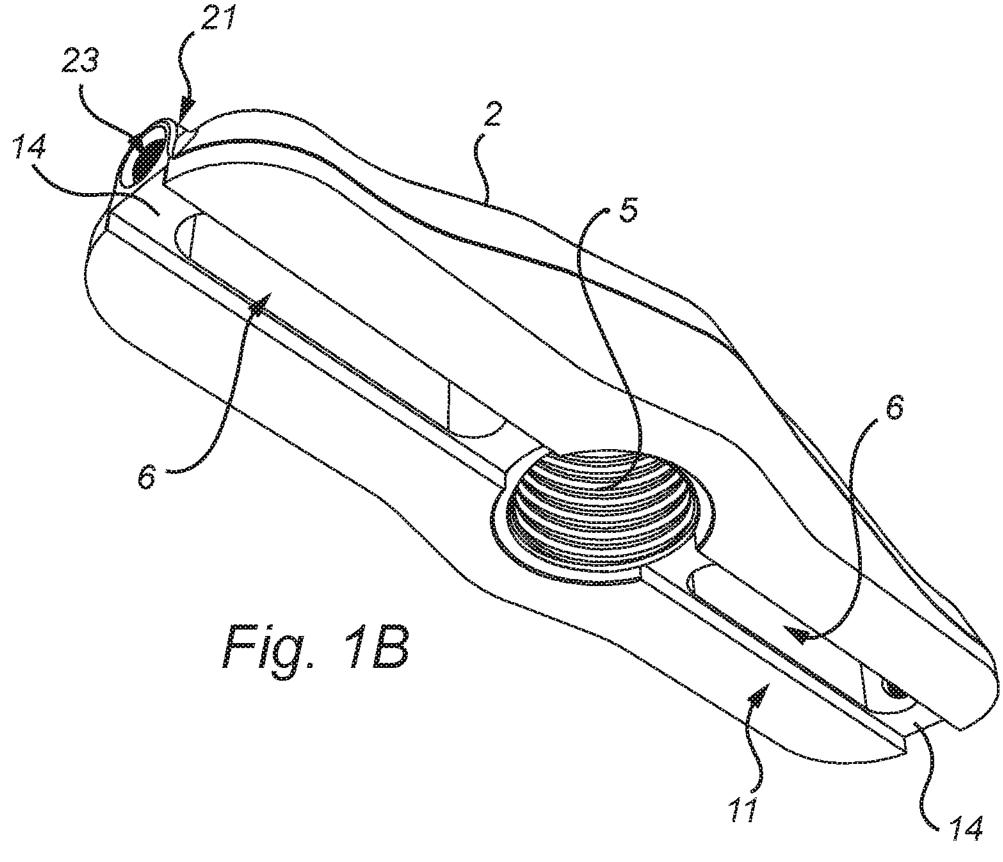
Figure 1C:
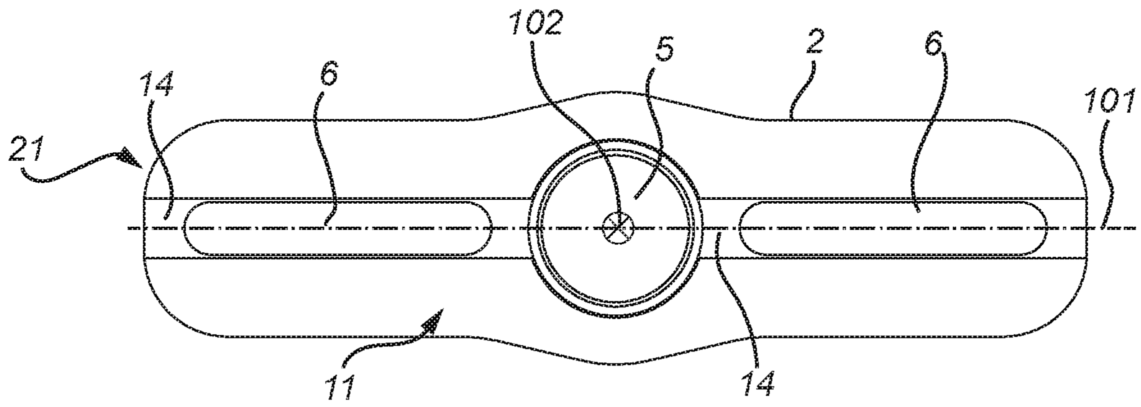
FIG. 1C illustrates a straight bottom view of the tool yoke in FIGS. 1A and 1B.
Figure 1D:
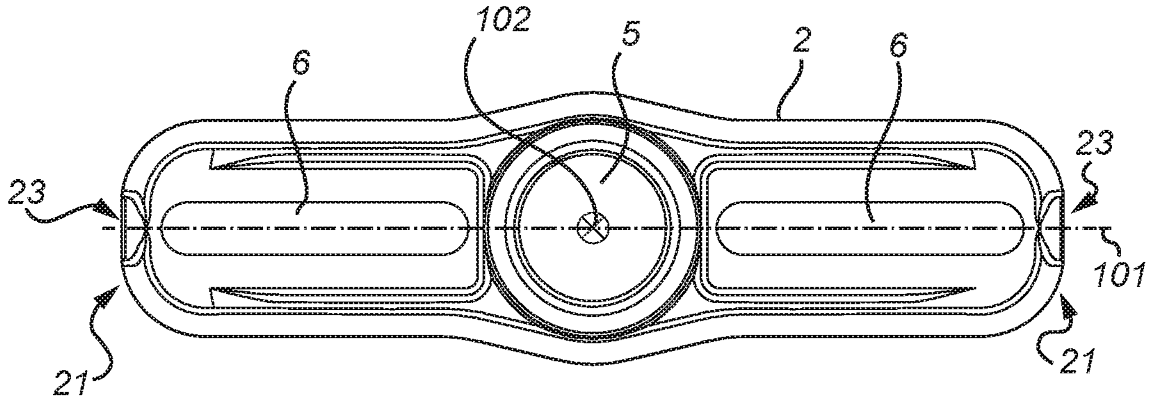
FIG. 1D illustrates a straight top view of the tool yoke in FIGS. 1A and 1B.

FIG. 1A and FIG. 1B illustrate different perspective views of a tool yoke 2 according to an embodiment of the present invention. The tool yoke 2 has an elongated body which extends along a first axis (ref. 101 in FIGS. 1C and 1D). Further, there are two slits 6 arranged on each side of a threaded central through hole 5, the slits are enclosed within the elongated body and have a main extension along the first axis 101. The slits 6 form a passage from a top side 22 of the tool yoke 2 through the tool yoke and to a bottom side 11 of the tool yoke, same as the central through hole 5.

Further the tool yoke 2 has a pair of threaded securing holes 23 arranged on a flank surface 21 of each side of the tool yoke. A flank surface is in the present context to be interpreted as the side surface arranged on the short side of the elongated body. The threaded securing holes 23 have a central axis parallel to the first axis 101, in this embodiment, the central axis of the securing holes extends along the first axis 101. Moreover, the threaded securing holes 23 provide a passage from the flank surface (short side surface), through the tool yoke, into each slit 6.

In the following, several different embodiments of the inventive tool kit 1 will be disclosed in reference to FIGS. 2-6. However, the operational principles regarding how to use the different tool kit embodiments will for the sake of brevity not be described in any greater detail for all of the different embodiments and are instead considered to be readily understood by the skilled artisan. Furthermore, the following is considered to serve a purpose, among others, of elucidating the versatility of the tool kit in how it can easily be reconfigured to be suitable for various vehicle repair/maintenance applications.

Figure 2A:
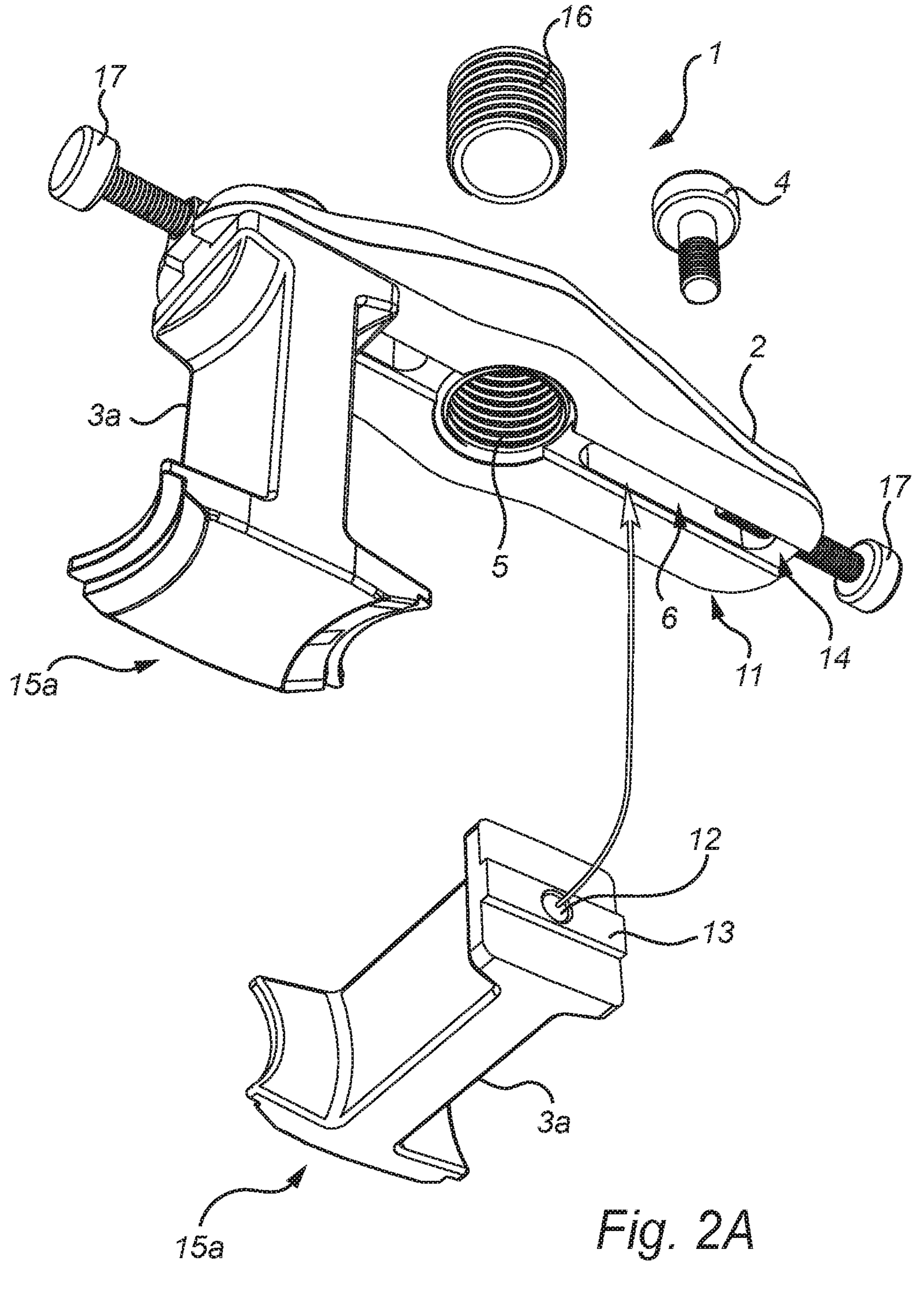
FIG. 2A illustrates a perspective view of a tool kit in accordance with an embodiment of the present invention.
Figure 2B:
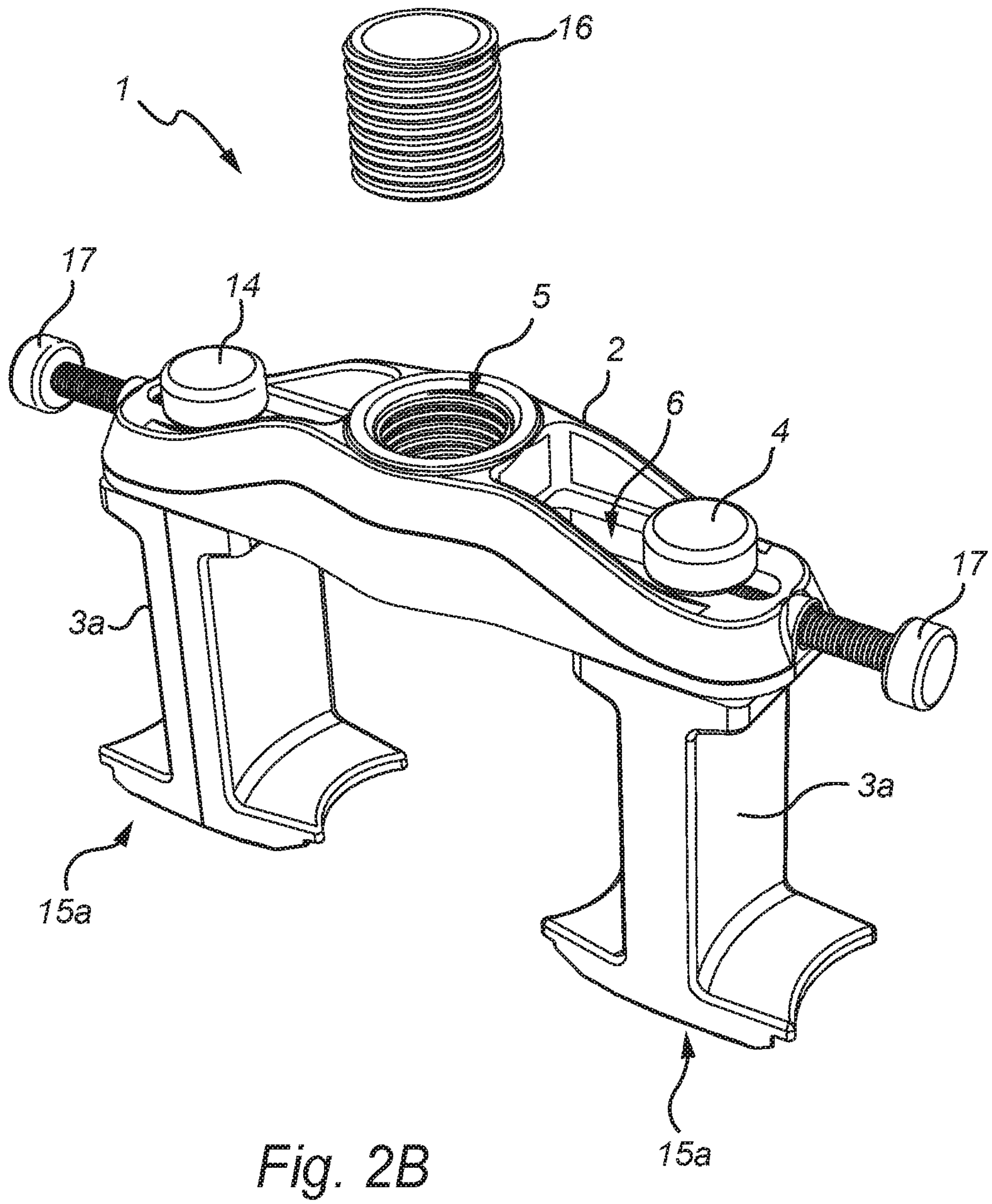
FIG. 2B illustrates a different perspective view of the tool kit illustrated in FIG. 2A.

FIG. 2A is a perspective view illustration of a tool kit 1 including a pair of jaw units 3*a* to be attached to the tool yoke 2 (illustrated from a different perspective in FIG. 2B). The tool kit 1 in this embodiment, illustrated in FIG. 2A, operable to be used in dismounting operations of compact wheel bearings. The jaw units 3*a*, here in the form of T-shaped structures/abutments, are attachable to a bottom surface 11 of the tool yoke by means of a threaded jaw fastener 4, here in the form of a threaded bolt, which is to engage a correspondingly threaded hole 12 in the jaw units. Further, each of the jaw units 3*a* has a protruding guide portion 13*a* which is insertable into a recessed groove 14 arranged on the bottom surface of the tool yoke 2. The groove 14 is an elongated groove extending along the extension axis of the tool yoke, so that the jaw units 3*a* can move along a length thereof in a non-rotational sliding manner. This feature aids to ensure that the pair of jaw units are centered in reference to each other but also in reference to the vehicle component around which the jaw units are intended to engage, thereby optimizing pressure distribution.

The tool yoke further has a pair of slits 6 arranged on each side of the central through hole 5. The jaw units 3*a* can accordingly secured by the jaw fastener 3*a* at varying position along the elongated extension axis of the tool yoke, which consequently translated to adaptability to various radii of e.g. wheel bearings or wheel hubs.

In operation the jaw units 3*a* are loosely attached to the tool yoke 2 whereby the jaw units 3*a* are subsequently positioned around a wheel hub of a car. More specifically the foot portions 15*a* are arranged to abut against a circumference of the seat holding the wheel bearing. The jaw fasteners 4 are then tightened in order to secure the position of the jaw units 3*a*, and one can also further secure the position of the jaw units by tightening the securing fasteners 17. The securing fasteners 17 ensure that the jaw units 3*a* cannot move away from each other during operation, thereby reducing the risk of injury or damaging to the tool kit 1 and/or the vehicle.

Next, a hydraulic cylinder (not shown) and in particular, the pulling rod of a hydraulic cylinder is inserted through the central through hole 5 and further through the wheel bearing and secured by means of a bolt behind the wheel bearing. Upon actuation of the hydraulic cylinder, the tool kit will act as a counter-hold while the hydraulic cylinder pulls the pulling rod and consequently the wheel bearing out of its seat. Preferably, a sleeve 16 having an outer threading is inserted into the central through hole 5 in order to facilitate operation by e.g. reducing the risk of the pulling rod of the hydraulic cylinder engaging the threads of the central through hole 5. An example of such a hydraulic cylinder is disclosed in the currently unpublished and pending European Patent Application No. 15189415.1, by the same Applicant, incorporated herein by reference.

Figure 3A:
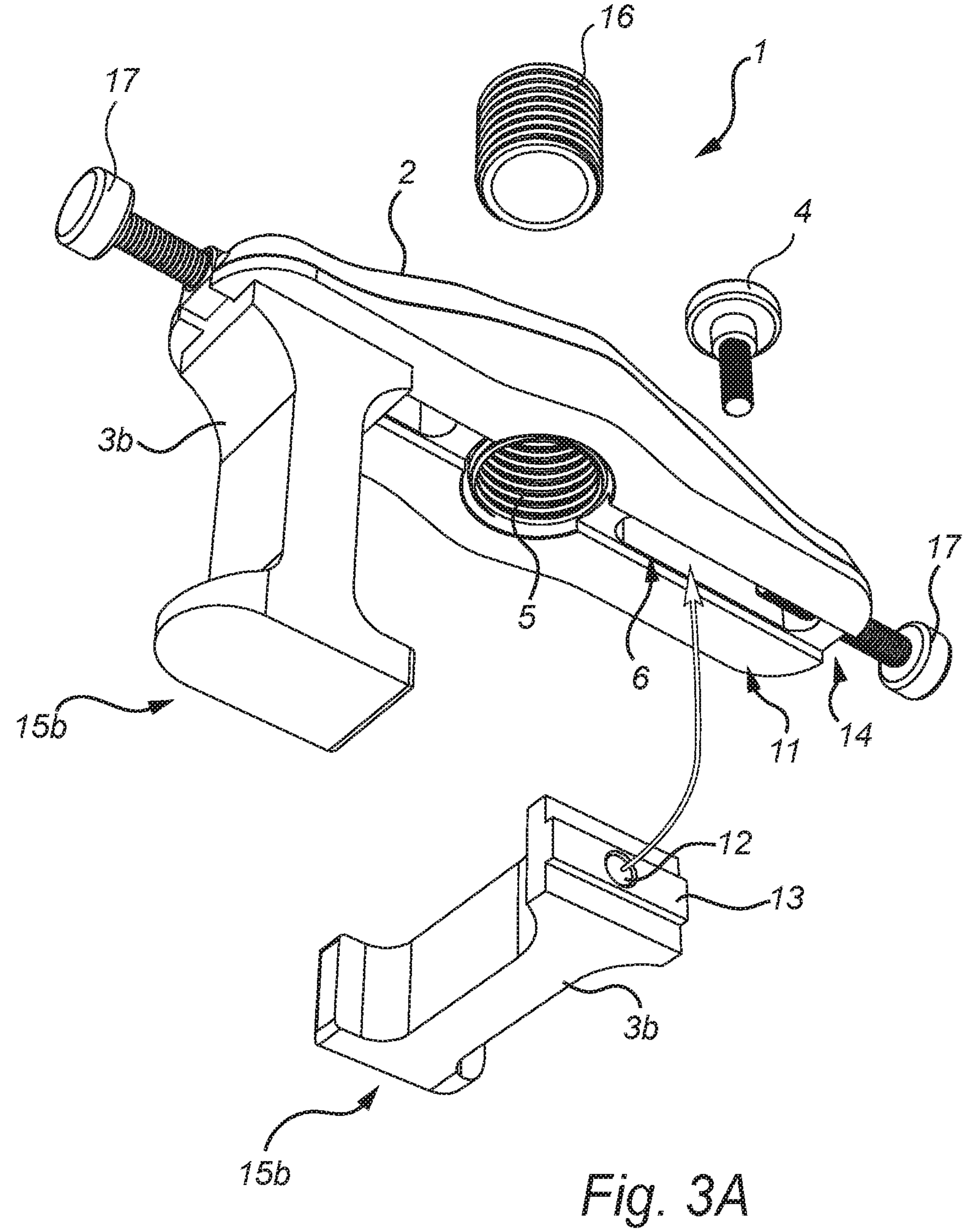
FIG. 3A illustrates a perspective view of a tool kit in accordance with another embodiment of the present invention.
Figure 3B:
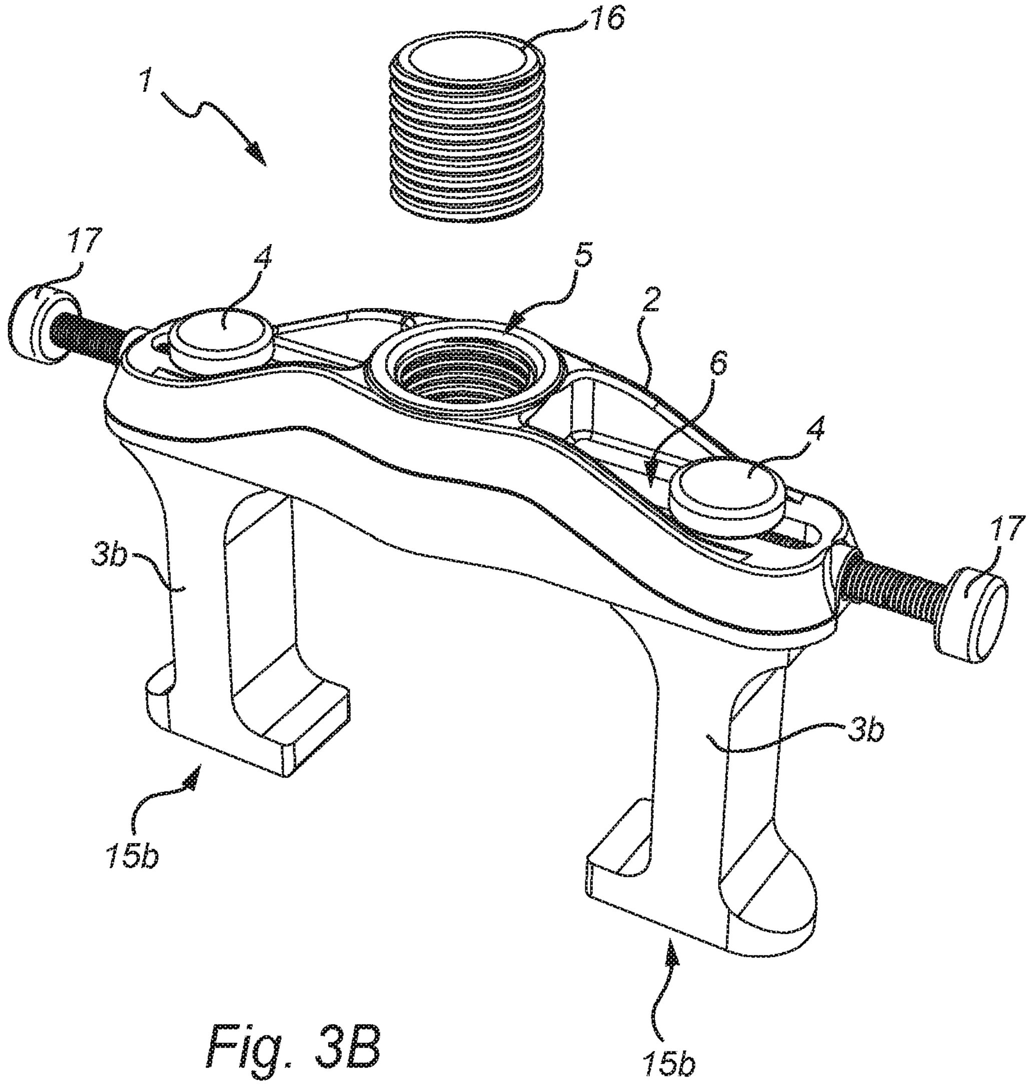
FIG. 3B illustrates a different perspective view of the tool kit illustrated in FIG. 3A.

FIGS. 3A-B illustrate different perspective views of a tool kit 1 in accordance with another embodiment of the present invention. Here, the versatility of the tool yoke 2 is shown. In more detail, by attaching a pair of jaw units 3*b*, here in the form of T-shaped structures/abutments, that are designed for dismounting 4-bolted wheel bearings/hubs. Accordingly, the tool kit 1 is now operable to be used for a different dismounting operating as compared to the one described in reference to FIGS. 2A-B. The operational principles are analogous to the previously described and the skilled person readily realizes how to apply and use the tool kit 1 based on the foregoing.

Figure 4A:
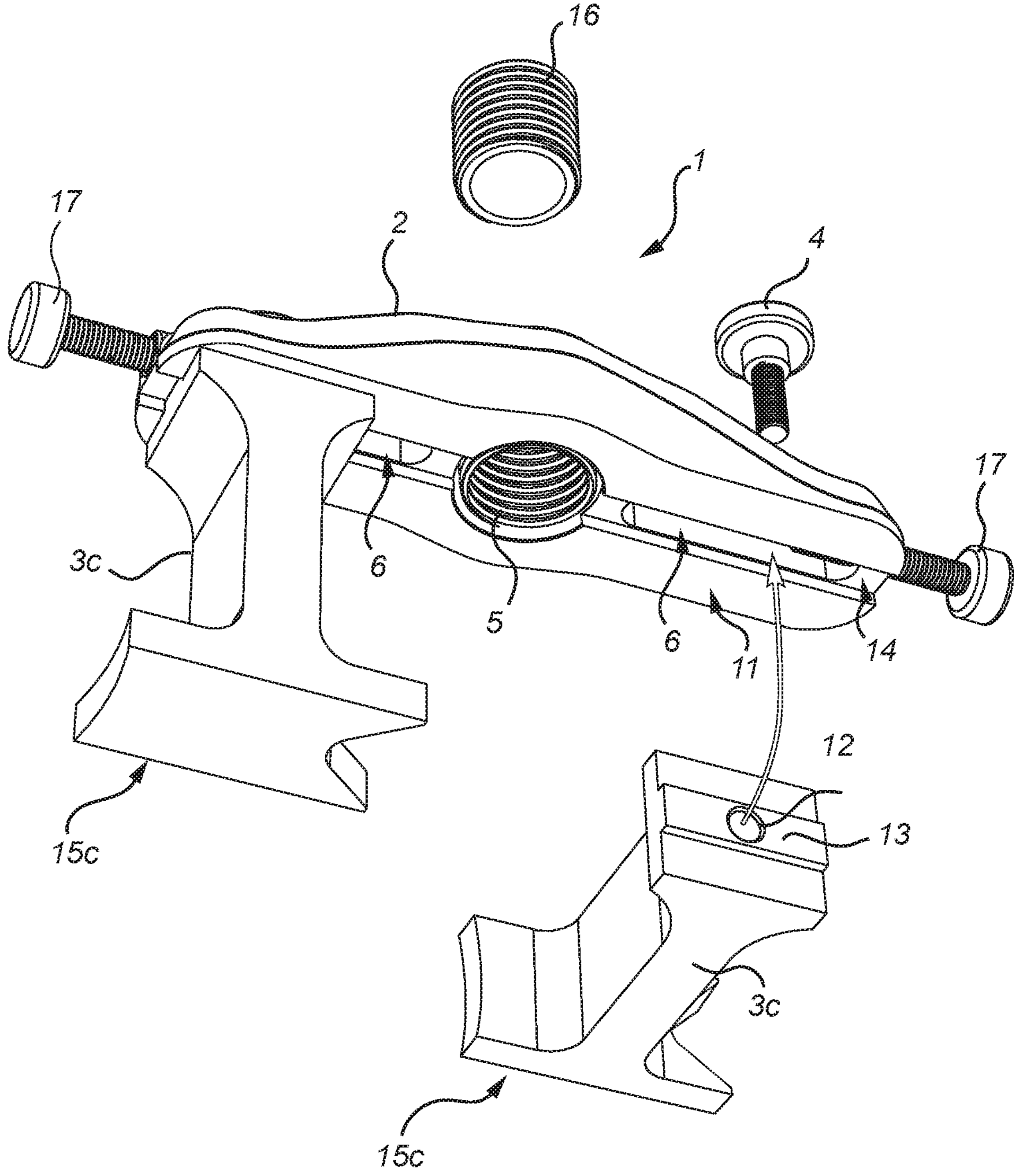
FIG. 4A illustrates a perspective view of a tool kit in accordance with yet another embodiment of the present invention.
Figure 4B:
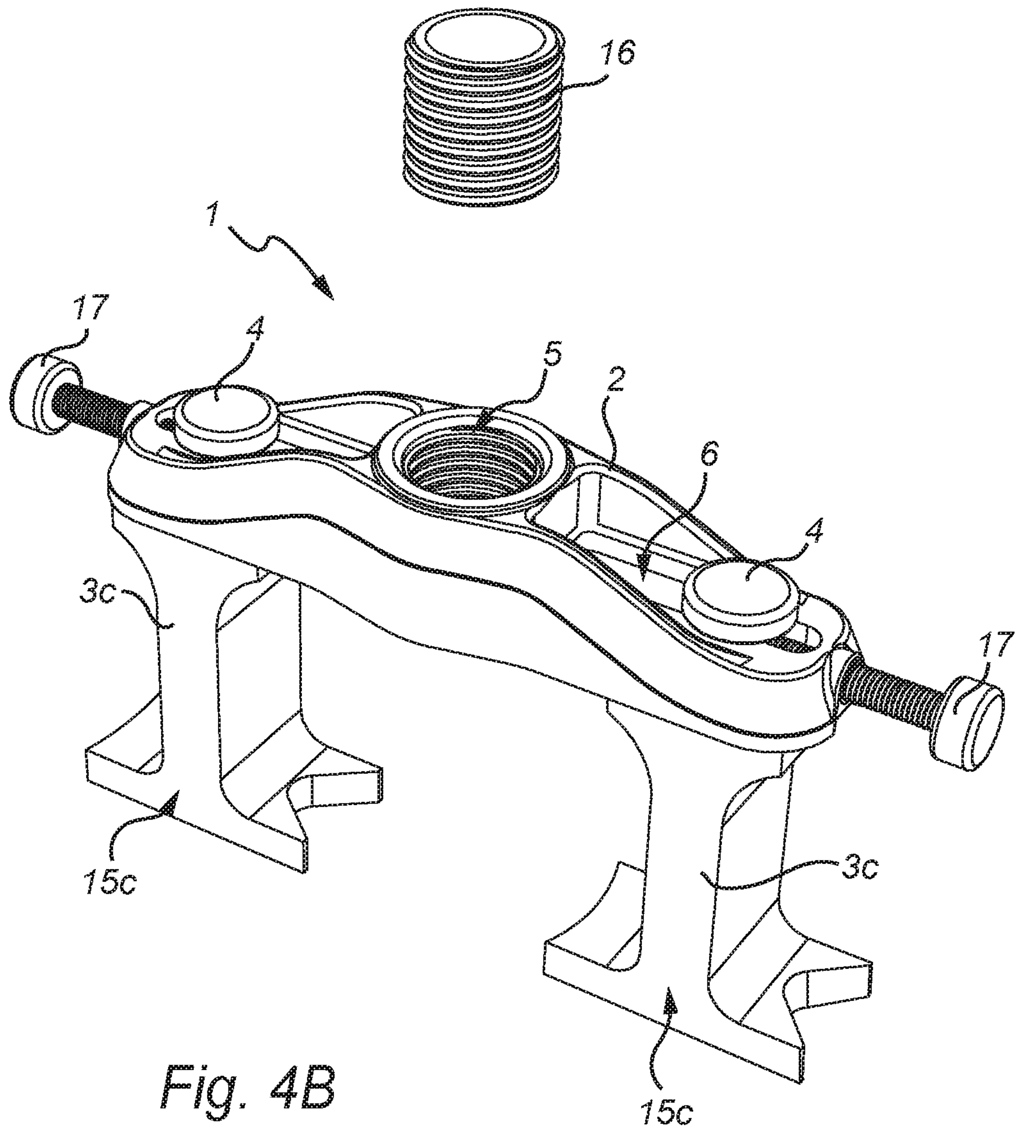
FIG. 4B illustrates a different perspective view of the tool kit illustrated in FIG. 4A.

FIGS. 4A-B illustrate different perspective views of a tool kit 1 in accordance with yet another embodiment of the present invention. The tool kit 1 comprises a tool yoke 2 and a pair of jaw units 3*c*, here in the form of T-shaped structures/abutments, attached thereto. The jaw units 3*c* are designed such that the tool kit 1 can be used to dismount 3-bolted wheel bearings/hubs. The operational principles are analogous to the dismounting operation previously described in reference to FIGS. 2A-B and the skilled person readily realizes how to apply and use the tool kit 1 based on that disclosure.

Figure 5A:
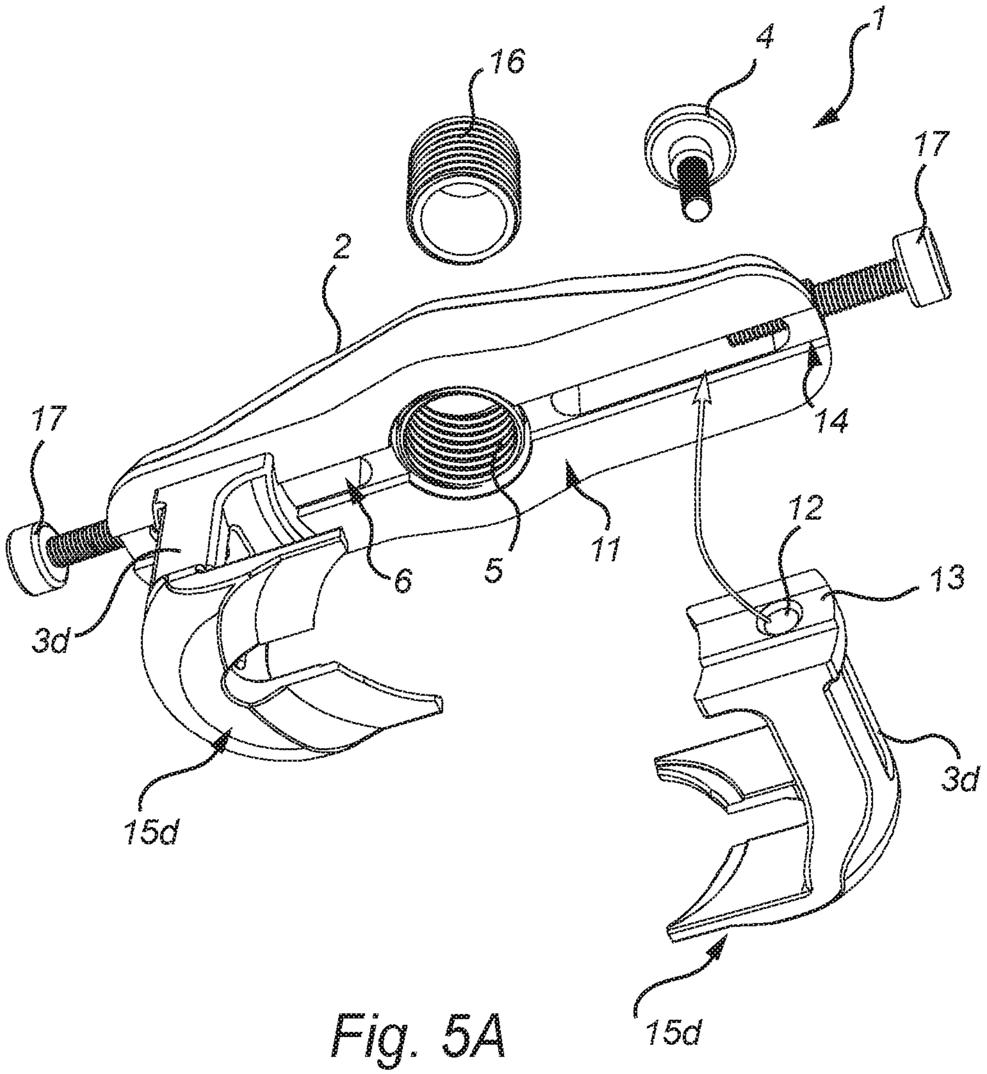
FIG. 5A illustrates a perspective view of a tool kit in accordance with yet another embodiment of the present invention.
Figure 5B:
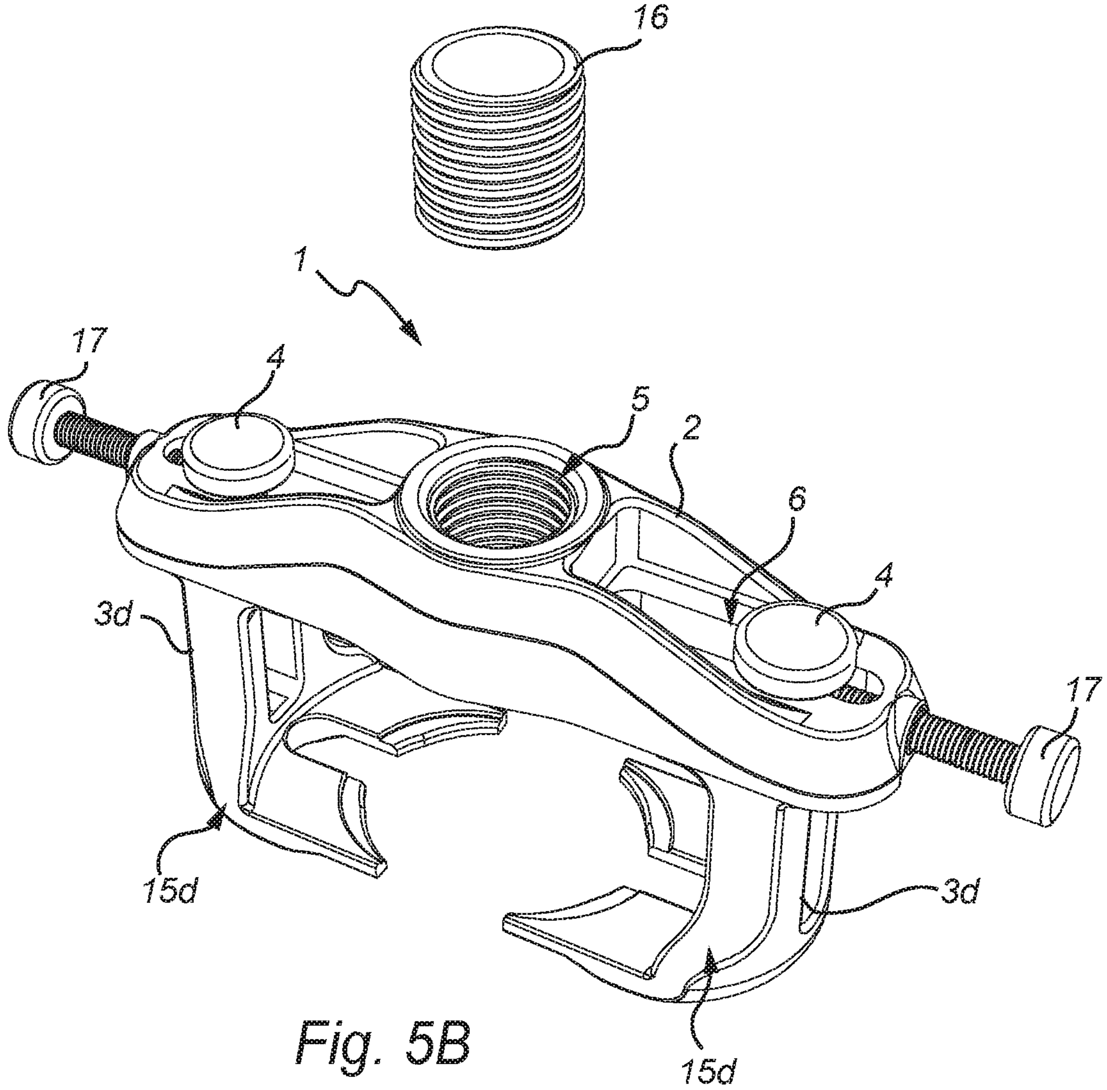
FIG. 5B illustrates a different perspective view of the tool kit illustrated in FIG. 5A.

FIGS. 5A-B illustrate different perspective views of a tool kit 1 in accordance with yet another embodiment of the present invention. The tool kit 1 comprises a tool yoke 2 and a pair of jaw units 3*d*, here in the form of L-shaped structures, attached thereto. The jaw units 3*d* are arranged such that the tool kit 1 can be used to mount compact wheel bearings, with or without locking rings. These types of assemblies are also known as a hub bearing unit (HBU) or hub bearing assembly, wheel hub bearings etc. An example of such a bearing is the HBU generation 2.1 wheel bearing by SKF AB.

Figure 5C:
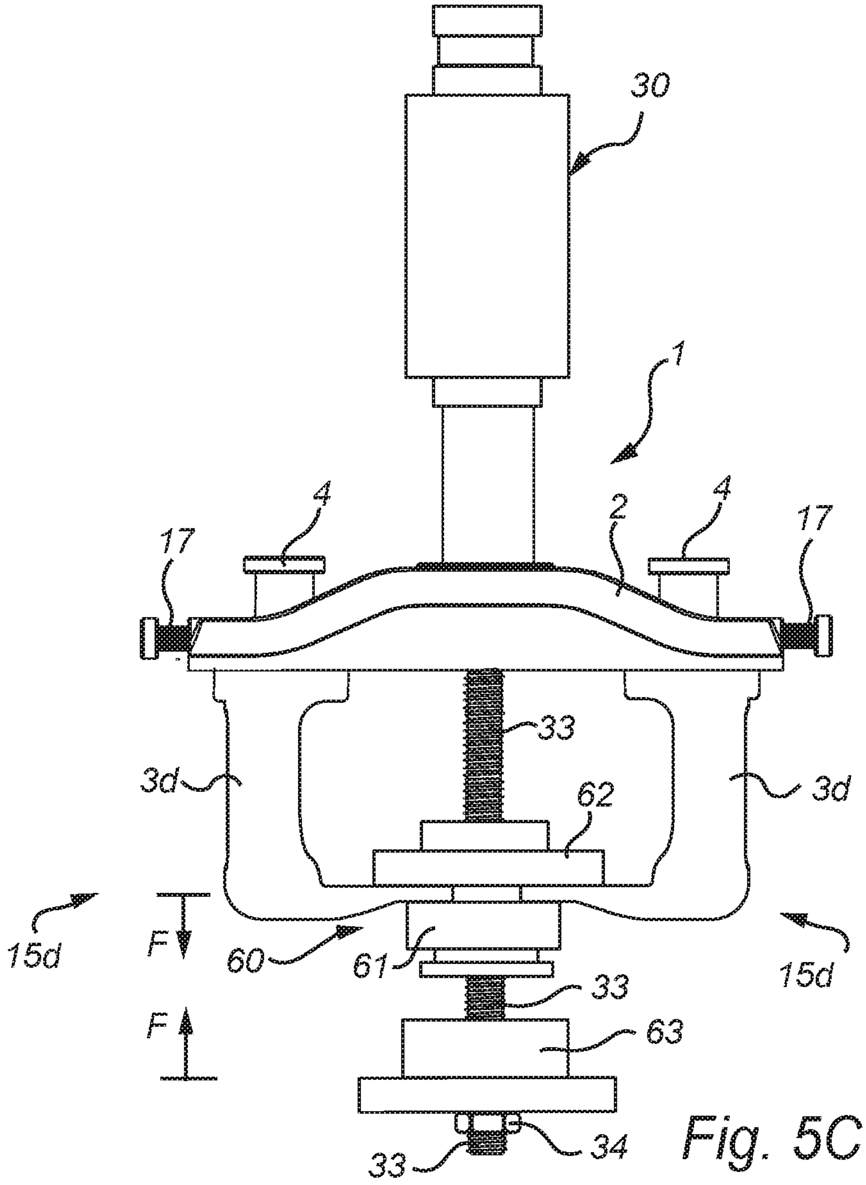
FIG. 5C illustrates a side view perspective of the tool kit in FIGS. 5A and 5B in a mounting operation.

FIG. 5C is a schematic side view illustration of a tool kit illustrated in FIGS. 5A and 5B, arranged on a wheel bearing assembly 60 together with a pressing device, here in the form of a hydraulic cylinder 30. The jaw units 3*d* are illustrated in an operating position where the foot sections 15*d* of the jaw units 3*d* are arranged in an intermediate space between the inner ring flange 62 (sometimes called a hub) and the outer bearing ring 61. The jaw units are then fastened to the tool yoke 2 by the treaded jaw fasteners 4, here in the form of a pair of bolts, one for each jaw unit 3*d*. Each of the bolts 4 engages a correspondingly threaded hole 12 in each jaw units 3*d* (see FIG. 5A). The jaw fasteners 4 are preferably left loose initially in order to properly arrange the jaw units 3*d* relative to the wheel bearing assembly 60, after which the jaw fasteners 4 are tightened. The tool kit 1 further has securing fasteners 17 arranged to enter through securing holes arranged on a flank surface 21 (see e.g. FIGS. 1A and 1B) of the tool yoke 2 in order to further secure the jaw units 3*d*, and more specifically to ensure that the jaw units 3 to not succumb to the pressing forces and move away from each other. The jaw units 3*d* are also provided with protruding guide portions 13 which engage a matching recessed groove 14 arranged on a bottom surface of the tool yoke, in order to align the jaw units 3*d* along a central axis of the tool yoke 2 and thereby ensure that the force exerted on the edge surface of the outer bearing ring 61 is evenly spread.

Further, the tool yoke has a threaded central through hole 5, into which a tubular protective sleeve 16 is arranged in order to protect the threading in the central through hole 5. Moreover, a tension/pulling rod 33 of the hydraulic cylinder 30 is provided through the central through hole, through the bearing assembly and through a bearing seat 63 (schematically illustrated) of an axle body of a vehicle. A pressing plate is arranged around the rod 33 on the opposite side of the bearing seat 63, as viewed from the tool kit 1, and the pressing plate is secured by means of a nut 34. Accordingly, once the hydraulic cylinder 30 is actuated the pressing plate and nut 34 will act as a counter-stay or counter-hold, i.e. when the hydraulic cylinder 30 pulls the rod 33 and thereby applies a compressing force (as indicated by arrows F), which translates to a pressing force onto the mounting tool which then transfers that pressing force to a surface of the outer bearing ring 61 via the foot sections 15*d* of the jaw units 3*d*. The tool yoke 2 and jaw units 3*d* are preferably made of a material having a tensile strength larger than 1200 $N/mm^2$ in order to be compatible with a hydraulic cylinder 30 capable of delivering a pressing force of 22 metric ton (roughly 220 kN of pressing force) and accordingly to withstand such a pressing force. The tool yoke 2 and jaw units 3*d* may for example be made from toughened or hardened steel. However, the components can be made from weaker materials capable of withstanding pressing forces of up to 7 metric ton (roughly 70 kN of pressing force), depending on the desired application.

Figure 6A:
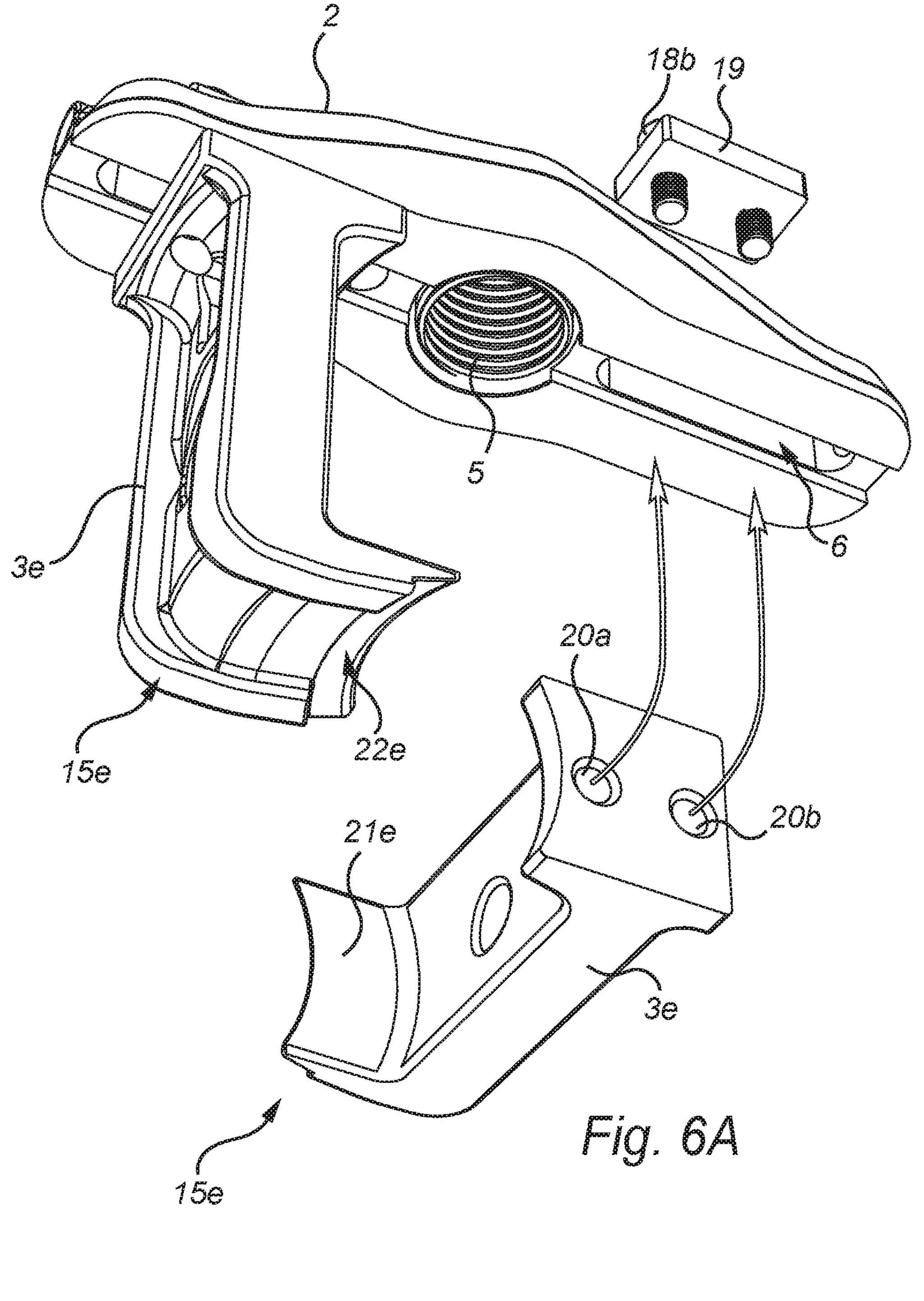
FIG. 6A illustrates a perspective view of a tool kit in accordance with yet another embodiment of the present invention.
Figure 6B:
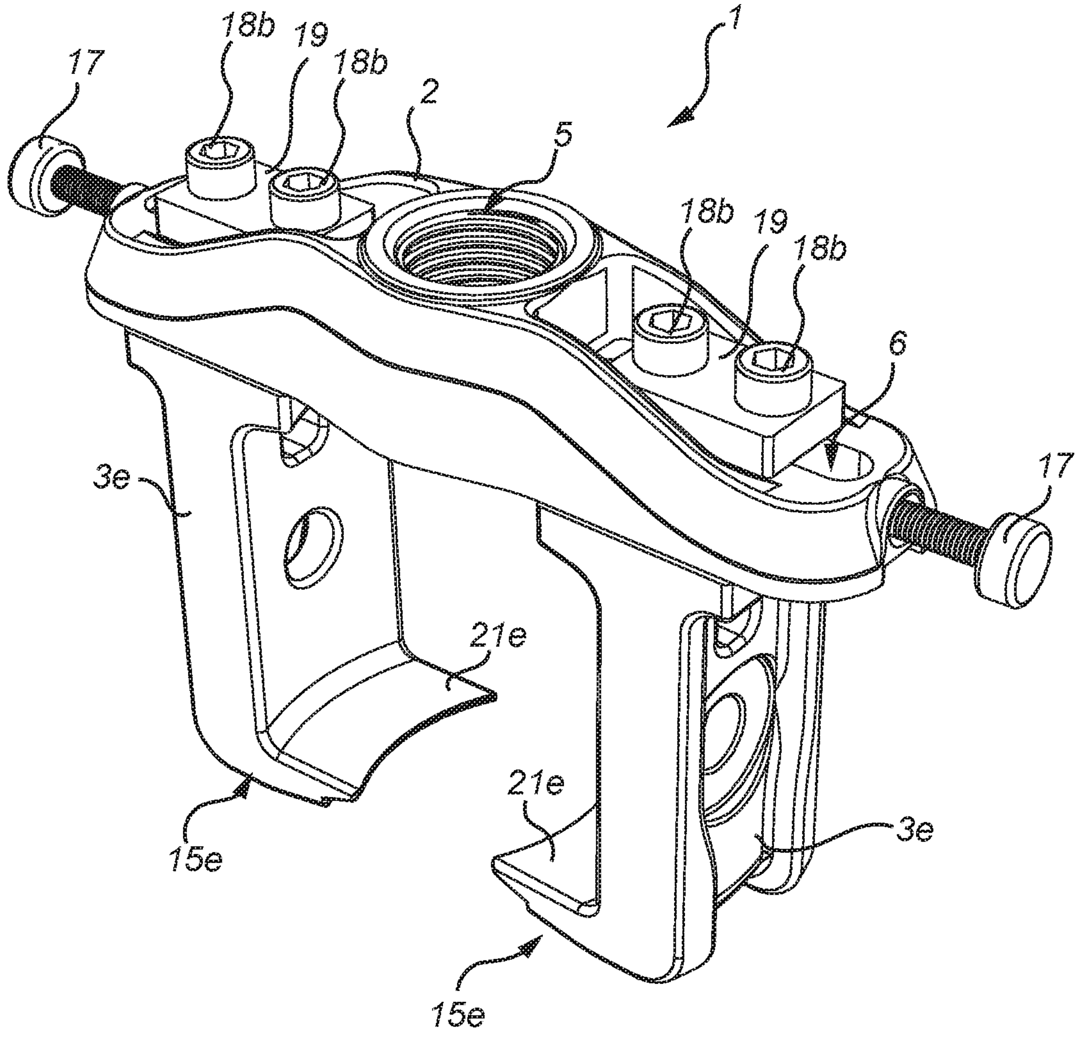
FIG. 6B illustrates a different perspective view of the tool kit illustrated in FIG. 6A.

FIGS. 6A-B illustrate different perspective views of a tool kit 1 in accordance with yet another embodiment of the present invention. The tool kit 1 comprises a tool yoke 2 and a pair of jaw units 3*e* attached thereto. The jaw units 3*e* are designed such that the tool kit 1 can be used to dismount wheel hubs. In more detail, a hydraulic cylinder can be secured to the tool yoke 2 by means of the threaded screw hole, e.g. by threading a portion of the hydraulic cylinder and thereby applying a pulling force to the tool kit 1 and consequently to the wheel hub via the jaw units 3*e*. Thus, having a threaded central through hole 5 the tool kit 1 can be used as a pulling tool as well instead of acting as a counter hold during dismounting operations. This is advantageous in dismounting operations where it is desirable to apply pressure to a surface of the vehicle component that is in contact with the upper surface 21*e* instead of the opposite bottom surface 22*e* when the tool kit 1 is acting as a counter hold, see for example FIG. 6C.

Further, the jaw units 3*e* are secured to the tool yoke 2 by two jaw fasteners 18*a*, 18*b*. Moreover, the two jaw fasteners share a common washer 19. This increases the robustness of the tool kit 1 since the risk of a jaw fastener breaking during operation is diminished. Also, by using a single common washer 19 for each jaw unit 3*e*, the size of the jaw unit 3*e* is reduced since two separate washers would translate into a larger distance between the jaw fasteners 18*a*, 18*b* and therefore require the corresponding holes 20*a*, 20*b* to be further separated. Furthermore, the two jaw fasteners, which are arranged along the first axis (ref. 101 FIG. 1C or FIG. 1D) aid in making sure the jaw units 3*e* are centered and in good alignment relative to each other.

Figure 6C:
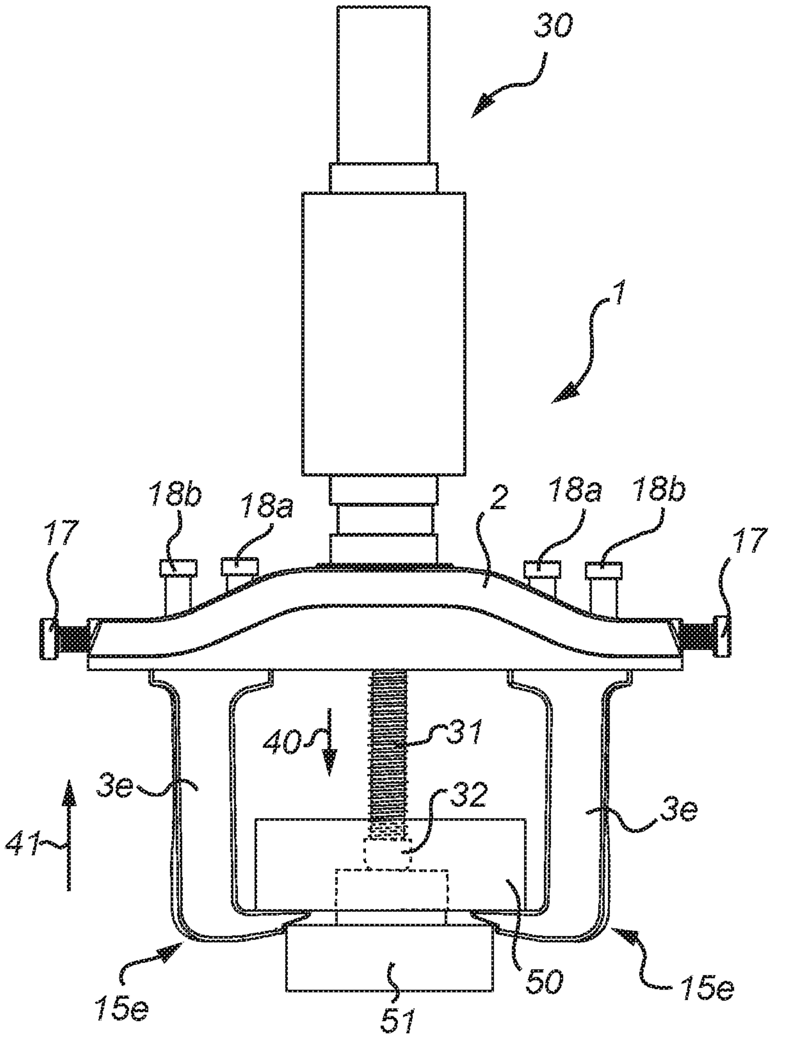
FIG. 6C illustrates a side view perspective of the tool kit in FIGS. 6A and 6B in a dismounting operation.

FIG. 6C is a schematic side view illustration of a tool kit illustrated in FIGS. 6A and 6B, arranged on e.g. a cardan shaft assembly 51 in order to dismount a support bearing 50 (schematically illustrated) together with a pressing device, here in the form of a hydraulic cylinder 30. The jaw units 3*e* are illustrated in an operating position where the foot sections 15*e* of the jaw units 3*e* are arranged to abut against an annular "back surface" (as viewed from the tool kit) of the support bearing 50. The cylinder has a press rod 31 with a punching socket 32 mounted on a distal end thereof (relative the cylinder main body). The press rod 31 extends through a center hole of the support bearing 50 and in order to abut against a central part of the cardan shaft assembly 51. Subsequently an operator may actuate the hydraulic cylinder and apply a pressing force 40 which will translate into a pulling force 41 exerted on the support bearing 50 by the jaw fasteners 3*e*.

The invention has mainly been described above with reference to a few embodiments. However, as is readily appreciated by a person skilled in the art, other embodiments than the ones disclosed above are equally possible within the scope of the invention, as defined by the appended claims.

In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A tool kit for vehicles for dismounting, mounting or separating components associated with transmission assemblies or suspension assemblies, comprising:

a tool yoke including:

an elongated body extending along a first axis, a central through hole having a hole axis perpendicular to said first axis, wherein said central through hole is threaded, and two slits, one slit arranged on each side of said central through hole, each slit being enclosed within the elongated body and having a main extension along said first axis, wherein each of said slits is arranged to receive at least one threaded jaw fastener extending therethrough; and a pair of jaw units attachable to said tool yoke by means of said threaded jaw fasteners extending through the slits, said jaw units being securable to the tool yoke at different positions along the first axis.

2. The tool kit according to claim 1, wherein said tool yoke further includes:

a pair of threaded securing holes arranged on a flank surface of each side of the tool yoke, said threaded securing holes having a central axis parallel to said first axis; and wherein each of said threaded securing holes is arranged to receive a correspondingly threaded securing fastener having a bottom surface configured to abut against said jaw fastener within said slit, in order to block said jaw units from moving away from each other during operation of the tool kit.

3. The tool kit according to claim 1, wherein said tool yoke further includes a recessed groove arranged on a bottom surface which is facing said jaw units when the jaw units are attached to the tool yoke, and wherein each of said jaw units comprises at least one protruding guide portion insertable into the recessed groove, for allowing a non-rotational, sliding movement of the jaw units along the tool yoke.

4. The tool kit according to claim 1, further comprising:

a pair of threaded jaw fasteners arrangeable to extend through each slit so to engage correspondingly threaded openings in each jaw unit;

a single washer for each pair of threaded jaw fasteners for supporting a pair of threaded jaw fastener heads during a pulling operation.

5. The tool kit according to claim 1, further comprising a sleeve having an outer threading and being configured to engage and be mounted in the threaded central through hole in order to shield the threads during operation of the tool kit.

6. The tool kit according to claim 1, wherein the pair of jaw units are each formed as an L- or T-shaped structure having a stem section and a foot section, each stem section comprising at least one threaded bore hole formed on a top surface of the stem section and extending along a main extension axis of the stem section; and wherein the extension axis of the stem sections is parallel to the central axis of the central through hole when the jaw units are attached to the tool yoke.

* * * * *